(12) United States Patent
Wang et al.

(10) Patent No.: US 10,916,174 B2
(45) Date of Patent: Feb. 9, 2021

(54) IMAGE DISPLAY CONTROL METHOD AND DEVICE, AND DISPLAY SCREEN CONTROL SYSTEM

(71) Applicant: Xi'an NovaStar Tech Co., Ltd., Xi'an (CN)

(72) Inventors: Huorong Wang, Xi'an (CN); Jingguo Zong, Xi'an (CN); Cheng Yang, Xi'an (CN)

(73) Assignee: XI'AN NOVASTAR TECH CO., LTD., Xi'an (CN)

(*) Notice: Subject to any disclaimer, the term of this patent is extended or adjusted under 35 U.S.C. 154(b) by 0 days.

(21) Appl. No.: 16/586,917

(22) Filed: Sep. 28, 2019

(65) Prior Publication Data

US 2020/0027386 A1    Jan. 23, 2020

Related U.S. Application Data

(63) Continuation of application No. PCT/CN2017/101297, filed on Sep. 11, 2017.

(30) Foreign Application Priority Data

Apr. 14, 2017  (CN) .......................... 2017 1 0245547

(51) Int. Cl.
G09G 3/32 (2016.01)
G09G 3/20 (2006.01)

(52) U.S. Cl.
CPC ............. *G09G 3/2003* (2013.01); *G09G 3/32* (2013.01); *G09G 2320/0626* (2013.01); *G09G 2340/06* (2013.01)

(58) Field of Classification Search
CPC .................. G09G 5/02; G09G 3/2003; G09G 2320/0626; G09G 2340/06; G09G 2340/08; G09G 3/32; H04N 1/60; H04N 1/6002; H04N 1/6005; H04N 1/6008
See application file for complete search history.

(56) References Cited

U.S. PATENT DOCUMENTS

| | | | |
|---|---|---|---|
| 2004/0252218 A1* | 12/2004 | Kovvuri ................... | G09G 5/00 348/333.01 |
| 2005/0169551 A1* | 8/2005 | Messing .............. | G09G 3/2003 382/260 |
| 2009/0284461 A1* | 11/2009 | Hsu ...................... | G09G 3/3406 345/102 |
| 2016/0267631 A1* | 9/2016 | Shen ......................... | G06T 5/40 |
| 2016/0358584 A1* | 12/2016 | Greenebaum ......... | G06T 11/001 |

* cited by examiner

*Primary Examiner* — Antonio A Caschera
(74) *Attorney, Agent, or Firm* — Hemisphere Law, PLLC; Zhigang Ma

(57) ABSTRACT

The application relates to an image display control method and a display screen control system. The method includes: receiving an input image; performing luminance component mapping on target pixel data of the input image; converting the target pixel data after mapping from a luminance-chrominance separation color space to a primary color space; performing filtering on the target pixel data which are converted to the primary color space after mapping; and outputting the target pixel data after filtering to a display screen for image display.

8 Claims, 4 Drawing Sheets

IMAGE DISPLAY CONTROL METHOD AND DEVICE, AND DISPLAY SCREEN CONTROL SYSTEM

FIELD OF THE DISCLOSURE

The disclosure relates to the field of display technologies, and more particularly to an image display control method, an image display control device and a display screen control system.

BACKGROUND

At present, LED display screens have gotten more and more market attention with their high dynamics and high chromaticity. More and more advertisers and merchants are inclined to choose LED display screen as the medium for promotion. However, a long service life of the display screen will cause a drop of the display brightness, which will seriously affect the display effect of and affect the normal use of the user; and some outdoor display screens have insufficient brightness due to the limitations of the display apparatuses themselves, thereby resulting great inconvenience to users.

SUMMARY

The disclosure provides an image display control method, an image display control device, and a display screen control system, so as to solve the problem of insufficient brightness of the display screen and achieve the effect of brightness improvement.

On one hand, an image display control method is provided. The image display control method includes: receiving an input image; performing luminance-component mapping on target pixel data of the input image; converting the target pixel data after the luminance-component mapping from a luminance-chrominance separation color space to a primary color space; performing filtering on the target pixel data which are converted to the primary color space after the luminance-component mapping; and outputting the target pixel data after the filtering to a display screen for image display.

On another hand, a display screen control system is provided. The display screen control system includes a sending card, a receiving card and a light emitting diode (LED) display screen, the receiving card is connected between the sending card and the LED display screen. The sending card is configured (i.e., structured and arranged) for: receiving an input image; performing luminance-component mapping on the input image; converting the input image after the luminance-component mapping from a luminance-chrominance separation color space to a primary color space; performing filtering on the input image which is converted to the primary color space after the luminance-component mapping; and outputting the input image after the filtering to the receiving card to thereby drive the display screen for image display.

On still another hand, a display screen control system is provided. The display screen control system includes a sending card, a receiving card and a light emitting diode (LED) display screen, the receiving card is connected between the sending card and the LED display screen. The sending card is configured for: receiving an input image; and performing segmented probability statistics on pixel luminance component values of the input image. The receiving card is configured for: receiving probability statistical values (from the sending card); performing luminance-component mapping on pixel data of a local area of the input image, based on the probability statistical values; converting the pixel data of the local area after the luminance-component mapping from a luminance-chrominance separation color space to a primary color space; performing filtering on the pixel data of the local area which are converted to the primary color space after the luminance-component mapping; and outputting the pixel data of the local area after the filtering to the display screen for image display.

On even still another hand, an image display control device is provided. The image display control device includes: an inputting module, configured to receive an input image; a luminance-component mapping module, configured to perform luminance-component mapping on target pixel data of the input image; a color space converting module, configured to convert the target pixel data after the luminance-component mapping from a luminance-chrominance separation color space to a primary color space; a filter processing module, configured to perform filtering on the target pixel data which are converted to the primary color space after the luminance-component mapping; and an outputting module, configured to output the target pixel data after the filtering to a display screen for image display.

One of the above technical solutions may have the following advantages that: by performing luminance-component mapping on the input image, then converting the pixel data into the primary color space, and finally performing filtering to improve the detail contrast and brightness of the image; in this way, the brightness and the contrast of the displayed image can be effectively balanced, and can enhance the brightness of the image without losing the gray scale. It can solve the problem that the user cannot improve the display effect by adjusting the brightness, and thereby extend the lifetime of the display screen, provide convenience to the users and enhance the user experience.

Another technical solution may have the following advantages that: by implementing image brightness enhancing processing on hardware, the response speed of the entire control system can be improved consequently.

Still another technical solution may have the following advantages that: by performing image brightness enhancing processing by the sending card and the receiving card together, the response speed of the entire control system can be further improved as a result.

BRIEF DESCRIPTION OF THE DRAWINGS

In order to more clearly illustrate technical solutions of embodiments of the disclosure, drawings used in the embodiments will be briefly introduced below. Apparently, the drawings in the description below are merely some embodiments of the disclosure, a person skilled in the art can obtain other drawings according to these drawings without creative efforts.

DETAILED DESCRIPTION OF PREFERRED EMBODIMENTS

Technical solutions of embodiments of the disclosure will be clearly and fully described in the following with reference to the accompanying drawings in the embodiments of the disclosure. Apparently, the described embodiments are some of the embodiments of the disclosure, but not all of the embodiments of the disclosure. All other embodiments obtained by skilled person in the art without creative efforts based on the described embodiments of the disclosure are within the scope of protection of the instant application.

Embodiment 1

Figure 1A:
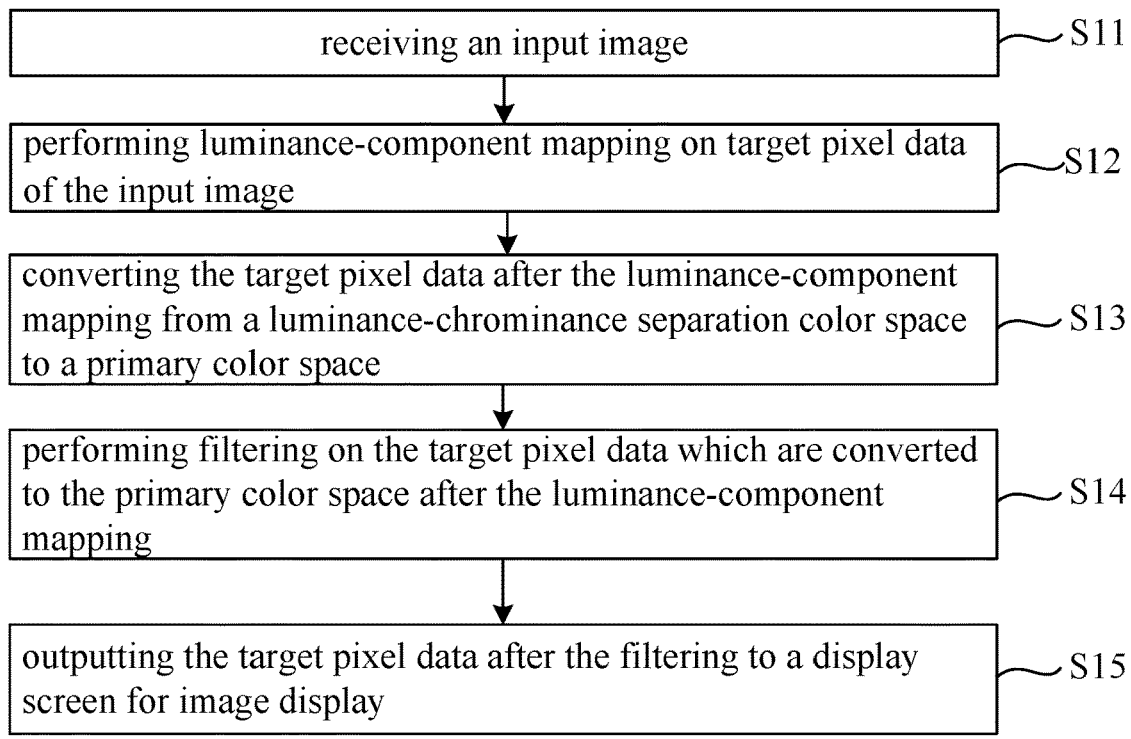
FIG. 1A is a schematic flowchart of an image display control method according to a first embodiment of the disclosure.

As shown in FIG. 1A, a first embodiment of the disclosure provides an image display control method, and the method includes the following steps:

S11, receiving an input image;

S12, performing luminance-component mapping on target pixel data of the input image;

S13, converting the target pixel data after the luminance-component mapping from a luminance-chrominance separation color space to a primary color space;

S14, performing filtering on the target pixel data which are converted to the primary color space after the luminance-component mapping; and S15, outputting the target pixel data after the filtering to a display screen for image display.

In order to understand the embodiment more clearly, the foregoing steps S11-S15 are described in detail below with specific examples.

For the step S11, the received input image is typically an image of a primary color space, such as an RGB image, in this case a following step is correspondingly included as that: converting the received input image from the primary color space to the luminance-chrominance separation color space, to facilitate the execution of step S12. Of course, the input image is not limited to an image of the primary color space, and in some application situations, an image of the luminance-chrominance separation color space is inputted directly, such as a YUV image, a YCbCr image, etc.

Figure 1B:
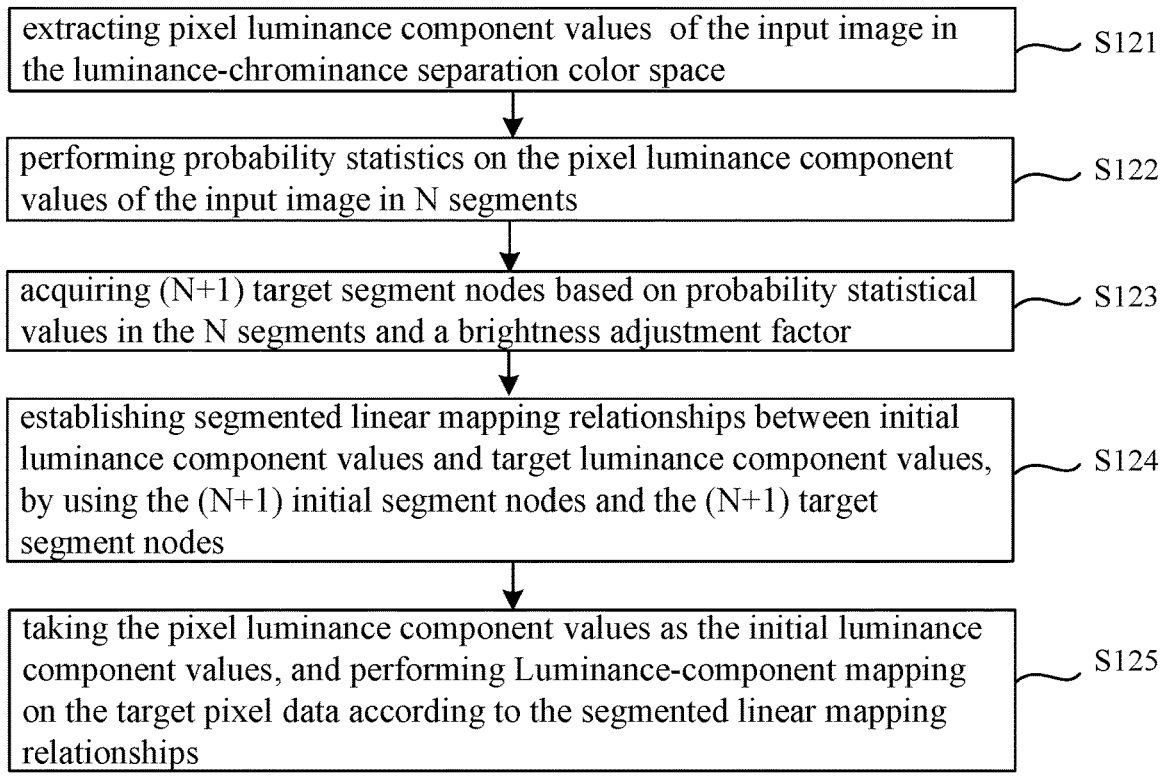
FIG. 1B is a schematic flowchart of a plurality of sub-steps of the step S12 of FIG. 1A.

For the step S12, it includes, for example, sub-steps S121-S125 as shown in FIG. 1B. Details are described as follows:

Sub-step S121: extracting pixel luminance component values of the input image in the luminance-chrominance separation color space; typically extracting the pixel luminance component values of all pixel data of the input image in the luminance-chrominance separation color space. It is noted that pixel data also include chrominance component values besides the luminance component values, in the luminance-chrominance separation color space. For example, for a YUV image, Y represents luminance component value, and UV represent chrominance component values. Similarly, for a YCbCr image, Y represents luminance component value, CbCr represent chrominance component values. In order to achieve brightness enhancement in the embodiment, the pixel luminance component values are mainly extracted, and the pixel chrominance component values can be kept unchanged; of course, if the input image is required to perform chrominance compensation, the pixel chrominance component values can also be processed properly.

Sub-step S122: performing probability statistics on the pixel luminance component values of the input image in N segments. Exemplarily, pixel luminance component values of all pixel data of the input image in the luminance-chrominance separation color space are performed with probability statistics in the N segments. For example, assuming N=5, and the ranges of segments respectively are [0, 50], [51, 101], [102, 152], [153, 203], and [204, 255], this 5 segments have 6 (that is, N+1) segment nodes, i.e., (0, 51, 102, 153, 204, 255). Next, the pixel luminance component values respectively corresponding to the pixel data of the input image are normalized to 0-255 gray scale range (corresponding to the input image is an 8-bit source), counts the number of pixels falling into each of the 5 segments, and finally the counted number of each segment is divided by the total number of pixels to obtain the probability of each segment, e.g., $P(P_0, P_1, P_2, P_3, P_4, P_5)$.

Sub-step S123: acquiring (N+1) target segment nodes based on probability statistical values in the N segments and a brightness adjustment factor. In detail, (N+1) target segment nodes are exemplarily obtained based on the probabilities of the segment $P(P_0, P_1, P_2, P_3, P_4, P_5)$ and the brightness adjustment factor $\partial$, and it can be implemented on hardware as per the following matrix operations.

(a) Initializing parameters. For example, parameters herein may include: a θ value, the range thereof being (0, 1), used to adjust the brightness and contrast of the whole image, and may take as a fixed value θ=0.5; the brightness adjustment factor $\partial$, $\partial>1$, used to set a target brightness level; a matrix b, which is a N×1 matrix, when N=5, the matrix b is a 5×1 matrix, i.e., matrix b=[255/$\partial$−255,0,0,0,0]; and a matrix A, which is a N×(2N−1) matrix, $A_{1,i}=1$, $i\in[1, N]$, and $A_{j,N+j-1}=1$, $A_{j,1 \ldots j}=-1$, $j\in[2, N]$, when N=5, the matrix A is represented as:

$$A = \begin{bmatrix} 1 & 1 & 1 & 1 & 1 & 0 & 0 & 0 & 0 \\ -1 & -1 & 0 & 0 & 0 & 1 & 0 & 0 & 0 \\ -1 & -1 & -1 & 0 & 0 & 0 & 1 & 0 & 0 \\ -1 & -1 & -1 & -1 & 0 & 0 & 0 & 1 & 0 \\ -1 & -1 & -1 & -1 & -1 & 0 & 0 & 0 & 1 \end{bmatrix}.$$

(b) According to values of $$P\left(\frac{1}{p_0+1/N}, \frac{1}{p_1+1/N}, \frac{1}{p_2+1/N}, \frac{1}{p_3+1/N}, \frac{1}{p_4+1/N}\right),$$

calculating $$\frac{1}{2\theta N}P_i$$

in order, and constructing an inverse matrix of a matrix H based thereon. In the embodiment, the matrix H is a (2N−1)×(2N−1) diagonal matrix, including matrix elements related to the aforementioned probability statistical values; when N=5, the inverse matrix of H is represented as:

$$H^{-1} = \begin{bmatrix} \frac{1}{2\theta N}P_0 & & & & & & & & \\ & \frac{1}{2\theta N}P_1 & & & & & & & \\ & & \frac{1}{2\theta N}P_2 & & & & & & \\ & & & \frac{1}{2\theta N}P_3 & & & & & \\ & & & & \frac{1}{2\theta N}P_4 & & & & \\ & & & & & \frac{N}{2(1-\theta)} & & & \\ & & & & & & \frac{N}{2(1-\theta)} & & \\ & & & & & & & \frac{N}{2(1-\theta)} & \\ & & & & & & & & \frac{N}{2(1-\theta)} \end{bmatrix}$$

(c) According to matrices of A, b, and $H^{-1}$, solving a matrix $Y=((AH^{-1}A^T)^{-1}AH^{-1})^T b=(y_1, y_2, \ldots, y_N)$, as per the following steps.

(c1) Solving $AH^{-1}$. Assuming the inverse matrix $H^{-1}$ is as below, since the matrix A just has elements of 1 and −1, and $H^{-1}$ is a diagonal matrix, solving $AH^{-1}$ just needs to perform element transformation:

$$H^{-1} = \begin{bmatrix} h_{11} & & & & & & & & \\ & h_{22} & & & & & & & \\ & & h_{33} & & & & & & \\ & & & h_{44} & & & & & \\ & & & & h_{55} & & & & \\ & & & & & k & & & \\ & & & & & & k & & \\ & & & & & & & k & \\ & & & & & & & & k \end{bmatrix},$$

$$AH^{-1} = \begin{bmatrix} h_{11} & h_{22} & h_{33} & h_{44} & h_{55} & & & & \\ -h_{11} & -h_{22} & & & & k & & & \\ -h_{11} & -h_{22} & -h_{33} & & & & k & & \\ -h_{11} & -h_{22} & -h_{33} & -h_{44} & & & & k & \\ -h_{11} & -h_{22} & -h_{33} & -h_{44} & -h_{55} & & & & k \end{bmatrix}.$$

(c2) Solving $AH^{-1}A^T$ according to step (c1). Since the matrix A just has elements of 1 or −1, there is only an addition operation in this step, and an adder is used to perform the operation in the hardware. $A^T$ is as below:

$$A^T = \begin{bmatrix} 1 & -1 & -1 & -1 & -1 \\ 1 & -1 & -1 & -1 & -1 \\ 1 & 0 & -1 & -1 & -1 \\ 1 & 0 & 0 & -1 & -1 \\ 1 & 0 & 0 & 0 & -1 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix},$$

and $AH^{-1}A^T$ is solved as below:

$$AH^{-1}A^T = \begin{bmatrix} h_{11}+h_{22}+h_{33}+h_{44}+h_{55} & -h_{11}-h_{22} & -h_{11}-h_{22}-h_{33} & -h_{11}-h_{22}-h_{33}-h_{44} & -h_{11}-h_{22}-h_{33}-h_{44}-h_{55} \\ -h_{11}-h_{22} & h_{11}+h_{22}+k & h_{11}+h_{22} & h_{11}+h_{22} & h_{11}+h_{22} \\ -h_{11}-h_{22}-h_{33} & h_{11}+h_{22} & h_{11}+h_{22}+h_{33}+k & h_{11}+h_{22}+h_{33} & h_{11}+h_{22}+h_{33} \\ -h_{11}-h_{22}-h_{33}-h_{44} & h_{11}+h_{22} & h_{11}+h_{22}+h_{33} & h_{11}+h_{22}+h_{33}+h_{44}+k & h_{11}+h_{22}+h_{33}+h_{44} \\ -h_{11}-h_{22}-h_{33}-h_{44}-h_{55} & h_{11}+h_{22} & h_{11}+h_{22}+h_{33} & h_{11}+h_{22}+h_{33}+h_{44} & h_{11}+h_{22}+h_{33}+h_{44}+h_{55}+k \end{bmatrix}.$$

(c3) Solving an inverse matrix of the result of step (c2) by using an adjoint matrix method. Assuming $AH^{-1}A^T=M$, that is as follows, $$M = \begin{bmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \\ m_{41} & m_{42} & m_{43} & m_{44} & m_{45} \\ m_{51} & m_{52} & m_{53} & m_{54} & m_{55} \end{bmatrix},$$

and then the modulo of the matrix M is solved as below:

$$|M| = m_{11} \cdot m_{22} \cdot m_{33} \cdot m_{44} \cdot m_{55} + m_{12} \cdot m_{23} \cdot m_{34} \cdot m_{45} m_{51} +$$
$$m_{13} \cdot m_{24} \cdot m_{35} \cdot m_{41} \cdot m_{52} + m_{14} \cdot m_{25} \cdot m_{31} \cdot m_{42} \cdot m_{53} +$$
$$m_{15} \cdot m_{21} \cdot m_{32} \cdot m_{43} \cdot m_{54} - m_{15} \cdot m_{24} \cdot m_{33} \cdot m_{42} \cdot m_{51} -$$
$$m_{11} \cdot m_{52} \cdot m_{43} \cdot m_{34} \cdot m_{25} - m_{21} \cdot m_{12} \cdot m_{53} \cdot m_{44} m_{35} -$$
$$m_{31} \cdot m_{22} \cdot m_{13} \cdot m_{54} \cdot m_{45} - m_{41} \cdot m_{32} \cdot m_{23} \cdot m_{14} \cdot m_{55}$$

When solving this value, the matrix M is stored in a RAM, during the address calculating operation, a two-dimensional address is used; during the data operation, the multiplication is performed while reading data, and the RAM address is transformed during the reading; one multiplier and one adder are needed in total, and the solving process can be implemented in a pipeline manner.

For example, $m_{11}^*$ can be obtained as below, $$m_{11}^* = (-1)^{1+1}(m_{22} \cdot m_{33} \cdot m_{44} \cdot m_{55} + m_{23} \cdot m_{34} \cdot m_{45} \cdot m_{52} +$$
$$m_{24} \cdot m_{35} \cdot m_{42} \cdot m_{53} + m_{25} \cdot m_{32} \cdot m_{43} \cdot m_{54} -$$
$$m_{52} \cdot m_{43} \cdot m_{34} \cdot m_{25} - m_{22} \cdot m_{53} \cdot m_{44} \cdot m_{35} -$$
$$m_{32} \cdot m_{23} \cdot m_{54} \cdot m_{45} - m_{42} \cdot m_{33} \cdot m_{24} \cdot m_{55},$$

and similar to the above, $m_{ij}^*$ can be obtained accordingly, $$M^{-1} = \frac{m_{ij}^*}{|M|}$$

can be obtained finally. Herein, a divider is needed to implement and complete the final solution.

(c4) Multiplying the matrices obtained from step (c3) and step (c1), that is, calculating $M^{-1}(AH^{-1})$.

(c5) Transposing it and then multiplying with the matrix b, thereby obtaining a matrix Y as below:

$$Y = ((AH^{-1}A^T)^{-1}AH^{-1})^T b = (y_1, y_2, y_3, y_4, y_5),$$

corresponding to the situation of N=5.

(d) According to the solved matrix Y, calculating $\Delta I_{dis,i} = y_i + \Delta I_{ori,i}$, i is in the range of [1,5], $y_i$ represents a contrast difference between the processed image and the input image in each segment; thereby obtaining new segment nodes:

new_segment=$[0, \Delta_{dis,1}, \Delta_{dis,1}+\Delta_{dis,2}, \Delta_{dis,1}+\Delta_{dis,2}+\Delta_{dis,3}, \Delta_{dis,1}+\Delta_{dis,2}+\Delta_{dis,3}+\Delta_{dis,4}, \Delta_{dis,1}+\Delta_{dis,2}+\Delta_{dis,3}+\Delta_{dis,4}+\Delta_{dis,5}]$, corresponding to the initial segment nodes old_segment=[0, 51,102,153,204,255] under the situation of N=5.

Figure 2:
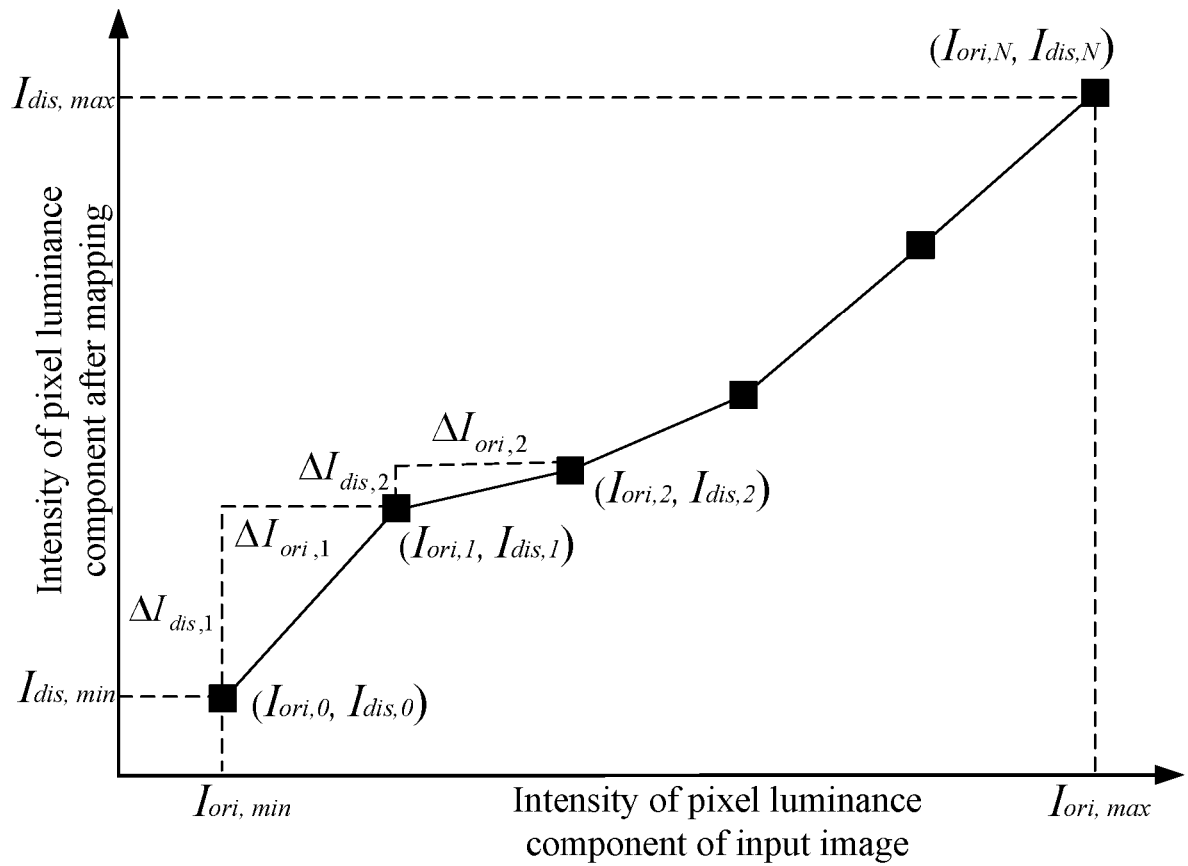
FIG. 2 is a schematic diagram showing a segmented linear mapping relationship curve of the first embodiment of the disclosure.

Sub-step S124: establishing segmented linear mapping relationships between initial luminance component values and target luminance component values, by using (N+1) initial segment nodes and (N+1) target segment nodes. For instance, it may be establishing segmented linear mapping relationships between initial luminance component values and target luminance component values as shown in FIG. 2, by using the (N+1) initial segment nodes such as old_segment and the (N+1) target segment nodes such as new_s-egment. When N=5, the established mapping relationships include five segmented linear relationships, where the abscissa represents an intensity of pixel luminance component of the input image, $I_{ori,min}$ and $I_{ori,max}$ respectively represent a minimum value and a maximum value thereof; where the ordinate represents an intensity of pixel luminance component after mapping, $I_{dis,min}$ and $I_{dis,max}$ respectively represent a minimum value and a maximum value thereof.

Sub-step S125: taking the pixel luminance component values as the initial luminance component values and performing luminance-component mapping on the target pixel data of the input image according to the segmented linear mapping relationships. For example, luminance component values of target pixel data of each frame of the input image in the luminance-chrominance separation color space are taken as initial luminance component values, and performing luminance-component mapping on the target pixel data of the input image according to the segmented linear mapping relationships. As such, based on the established segmented linear mapping relationships, through the luminance-component mapping on each pixel of each frame of the input image in the luminance-chrominance separation color space, luminance component value of each pixel after mapping can be accordingly obtained. Typically, in the embodiment, for the brightness enhancing of the input image, the steps of solving new segment nodes, establishing mapping relationships, and performing luminance-component mapping can be executed per frame, and accordingly, two RAM can be adopted for a ping-pong operation to solve and store. For example, a total of 256*8*2 bits of RAM is required, and distributed RAM s are used for implementation.

For the step S13, converting the target pixel data after the luminance-component mapping from a luminance-chrominance separation color space to a primary color space, for example, converting from a YUV color space or a YCbCr color space to a RGB color space.

For the step S14, performing filtering on the target pixel data which are converted to the primary color space after the luminance-component mapping. Taking pixel data of RGB color space as an example, the filtering process herein typically is filtering three color components of R, G, and B respectively, and the manner of the filtering can be a bandpass filtering to remove too small or too large color components, and thereby achieving the technical effect of further improving image contrast.

For the step S15, outputting the target pixel data after the filtering to a display screen such as an LED display for image display. Of course, the display screen also can be other type of display screen, such as a currently popular liquid crystal display screen or the like.

In summary, the embodiment calculates the probabilities that the luminance component values of the entire input image fall in respective N segments, combines the probability statistical values and a brightness adjustment factor to solve new segment nodes by using matrix operations, and then maps the luminance components of the input image to the new segmented linear mapping curves by luminance-component global mapping, converts the pixel data to the primary color space, and finally enhance the image by filtering to improve the detail contrast. Therefore, it can effectively balance the brightness and the contrast of the displayed image, and can enhance the brightness of the image without gray level losing. It can solve the problem that the user fails to improve the display effect of the display screen by increasing the brightness, substantially extend the life of the display screen. It provides users with convenience and improves the user experience consequently.

Embodiment 2

Figure 3:
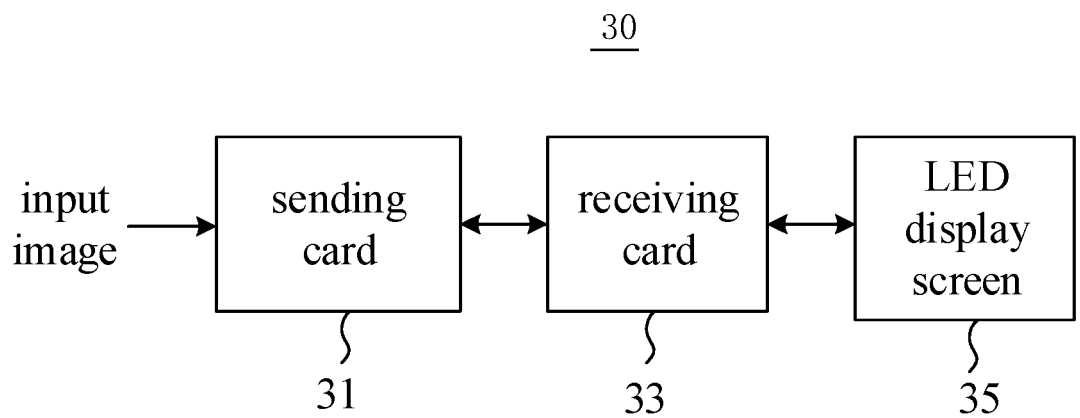
FIG. 3 is a structural diagram of a display screen control system according to a second embodiment of the disclosure.

As shown in FIG. 3, a second embodiment of the disclosure provides a display screen control system 30, which includes a sending card 31, a receiving card 33, and a LED display screen 35. The receiving card 33 is connected between the sending card 31 and the LED display screen 35. Specifically, the sending card 31 typically includes a video interface, a video decoder, a programmable logic device such as an FPGA device, a PHY chip and an output interface sequentially connected in that order, and a memory used in cooperation with the programmable logic device; but this embodiment is not limited thereto. The receiving card 33 typically includes a network port, a PHY chip, a programmable logic device such as an FPGA device and a female header connector sequentially connected in that order, and a memory used in cooperation with the programmable logic device; but this embodiment is not limited thereto. In addition, it is noted that, the number of the receiving card 33 connected to the sending card 31 is not limited to one, and may be multiple pieces connected in cascade, or even a plurality of strings of cascade-connected receiving cards connected to a plurality of output ports of the sending card 31 respectively. The LED display screen 35 includes, for example, one or more LED display cabinets. Each LED display cabinet is carried/driven by one or more receiving cards, and includes one LED panel or a plurality of cascade-connected LED panels. It can be understood that the LED panel is provided with LEDs as display pixels, a row decoding circuit, and a column driving circuit.

Moreover, the sending card 31 of the embodiment is capable of performing the image brightness enhancing process in the image display control method of the first embodiment. Details refer to FIG. 4, which is a schematic diagram showing the brightness enhancing process through the sending card 31.

Figure 4:
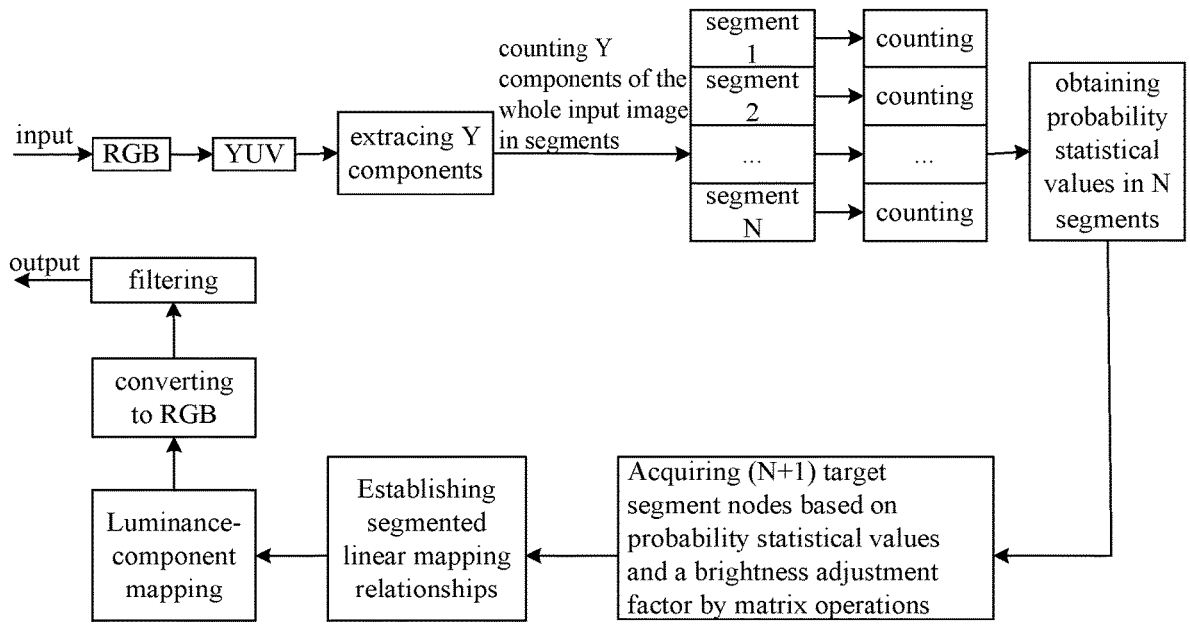
FIG. 4 is a schematic diagram showing a process of enhancing brightness through a sending card according to the second embodiment of the disclosure.

As shown in FIG. 4, the sending card 31 receives an input RGB image, converts the RGB image to a YUV image, extracts Y components of the YUV image, and then counts the Y components of the whole image in respective segments, such as counts the Y components falling in the respective N segments. Probability statistical values of the N segments can be obtained through dividing the count values of the respective segments by the total number of Y component values. Then target segment nodes are obtained through matrix operations, based on the probability statistical values of the respective segments and a brightness adjustment factor $\partial$(e.g., $\partial>1$). According to the target segment nodes and initial segment nodes, segmented linear mapping relationships are established, and the Y components extracted from the YUG image can be performed with luminance-component mapping to obtain mapped Y components (i.e., Y components after the mapping). The Y components after the mapping are combined with UV components of the YUV image and then are converted to be a RGB image. Finally, the RGB image is filtered to obtain a brightness enhancement image, and the brightness enhancement image is outputted to the receiving card 33. The receiving card 33 receives the image outputted from the sending card 31, captures/intercepts image data belong thereto and drives the LED display screen 35 to display an image according to the intercepted image data.

In this embodiment, the image brightness enhancing process in the image display control method is implemented on the sending card 31, that is, the image processing is implemented on the hardware, thereby realizing the advantage of fast system response speed.

Embodiment 3

A third embodiment of the disclosure provides a display screen control system with the same hardware structure as the display screen control system 30 of the second embodiment, and details are not described herein again. The difference is that the image brightness enhancing process is implemented by the sending card and the receiving card together. Details refer to FIG. 5, which is a schematic diagram showing the brightness enhancing process of the third embodiment.

Figure 5:
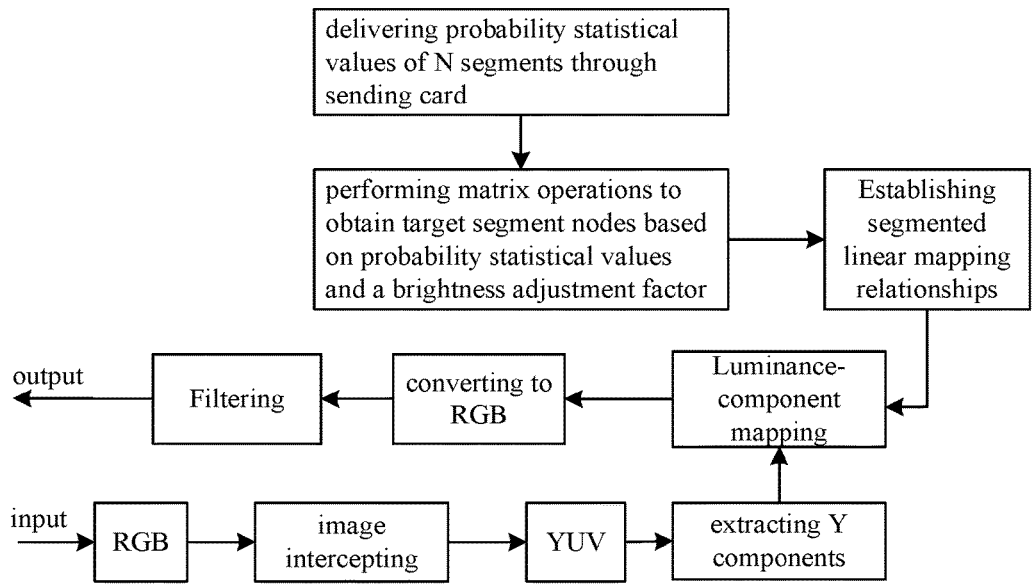
FIG. 5 is a schematic diagram showing a process of enhancing brightness through a sending card and a receiving card according to a third embodiment of the disclosure.

Referring to FIG. 5, the sending card 31 receives an input RGB image, converts the RGB image to a YUV image, extracts Y components of the YUV image, counts the Y components of the whole image in respective N segments to obtain probability statistical values and then delivers the probability statistical values to the receiving card. Afterwards, on one hand, the receiving card performs matrix operations to obtain target segment nodes, based on the probability statistical values of the respective segments and a brightness adjustment factor $\partial$(e.g., $\partial>1$), and establishes segmented linear mapping relationships according to the target segment nodes and initial segment nodes. On the other hand, the receiving card receives the RGB image outputted from the sending card, captures/intercepts target pixel data belonging to itself by image intercepting, converts the target pixel data as intercepted into a YUV color space and extracts Y components therefrom. Next, the receiving card performs luminance-component mapping on the Y components corresponding to the target pixel data based on the segmented linear mapping relationships, and obtains Y components after the mapping. The Y components after the mapping are combined with UV components of the target pixel data, and the combined components are converted into RGB pixel data. Finally, the RGB pixel data are filtered to obtain brightness enhanced target pixel data for driving the LED display screen 35 to display an image. It is noted that, the image pixel data intercepted by the receiving card may be all pixel data of the input RGB image (for example, in the case the LED display screen is carried/driven by a single piece of receiving card), or may be a part of pixel data of the input RGB image (for example, in the case the LED display screen is carried/driven by multiple pieces of receiving cards).

In this embodiment, the process of calculating target segment nodes and processes thereafter in the image display control method are implemented on the receiving card. Due to that the sending card just process the image pixel data belong to itself, the response speed of the control system can be improved in further.

Embodiment 4

Figure 6:
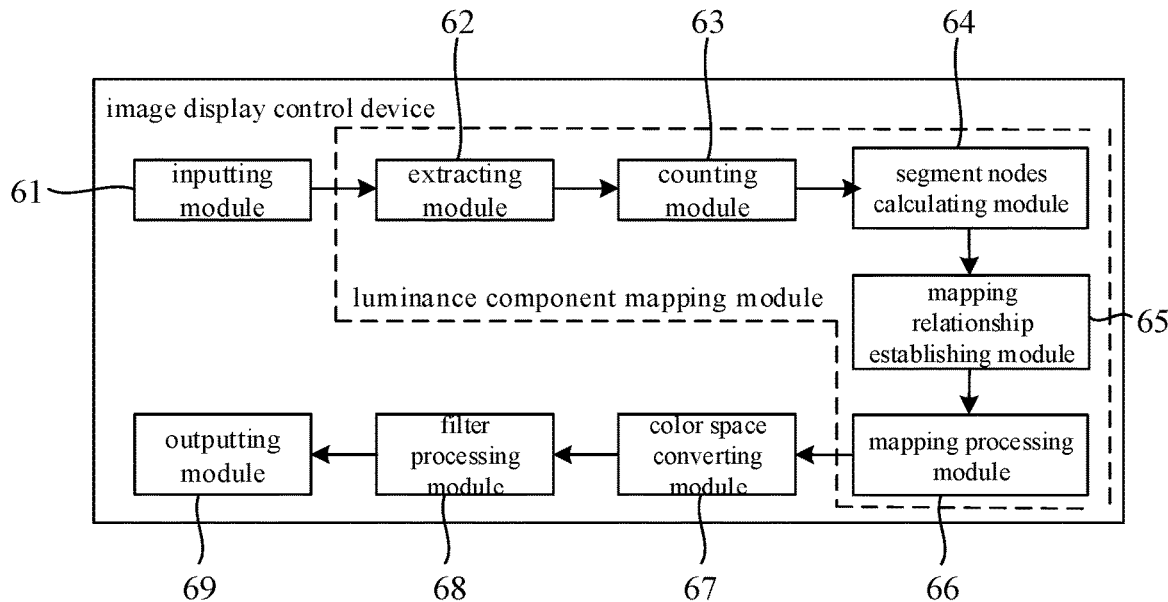
FIG. 6 is a schematic block diagram of an image display control device according to a fourth embodiment of the disclosure.

As shown in FIG. 6, a fourth embodiment of the disclosure provides an image display control device 60, which includes an inputting module 61, a luminance component mapping module, a color space converting module 67, a filter processing module 68, and an outputting module 69. Exemplarily, the luminance component mapping module is configured (i.e., structured and arranged) to perform luminance-component mapping on the pixel data of the input image, and includes an extracting module 62, a counting module 63, a segment nodes calculating module 64, a mapping relationship establishing module 65, and a mapping processing module 66. These modules 61-69 may be software modules, stored in a memory and executed by one or more processors, for example, these modules 61-69 may be stored in a memory of the sending card and executed by a programmable logic device thereof.

More specifically, the inputting module 61 is configured to receive an input image. The extracting module 62 is configured to extract luminance component values corresponding to pixel data of the input image in the luminance-chrominance separation color space. The counting module 63 is configured to perform probability statistics on the luminance component values of the input image by N segments, where N segments has (N+1) initial segment nodes and N refers to a positive integer greater than 1. Segment nodes calculating module 64 is configured to obtain (N+1) target segment nodes based on the probability statistical values of the N segments and a brightness adjustment factor. The mapping relationship establishing module 65 is configured to establish segmented linear mapping relationships between initial luminance component values and target luminance component values, based on the (N+1) initial segment nodes and the (N+1) target segment nodes. The mapping processing module 66 is configured to take the pixel luminance component values corresponding to pixel data of the input image in the luminance-chrominance color space as the initial luminance component values, and performing luminance-component mapping on pixel data of the input image, according to the segmented linear mapping relationships. The color space converting module 67 is configured to convert the pixel data after the luminance-component mapping to a primary color space from the luminance-chrominance color space. The filter processing module 68 is configured to perform filtering on the pixel data that are converted into the primary color space after the luminance-component mapping. The outputting module 69 is configured to output the filtered pixel data to the display screen for image display. Details of the specific functions of the modules 61-69, can be referred to the execution details of the steps S11-S15 and sub-steps S121-S125 in the foregoing first embodiment, and therefore no more details is provided herein.

Embodiment 5

Figure 7:
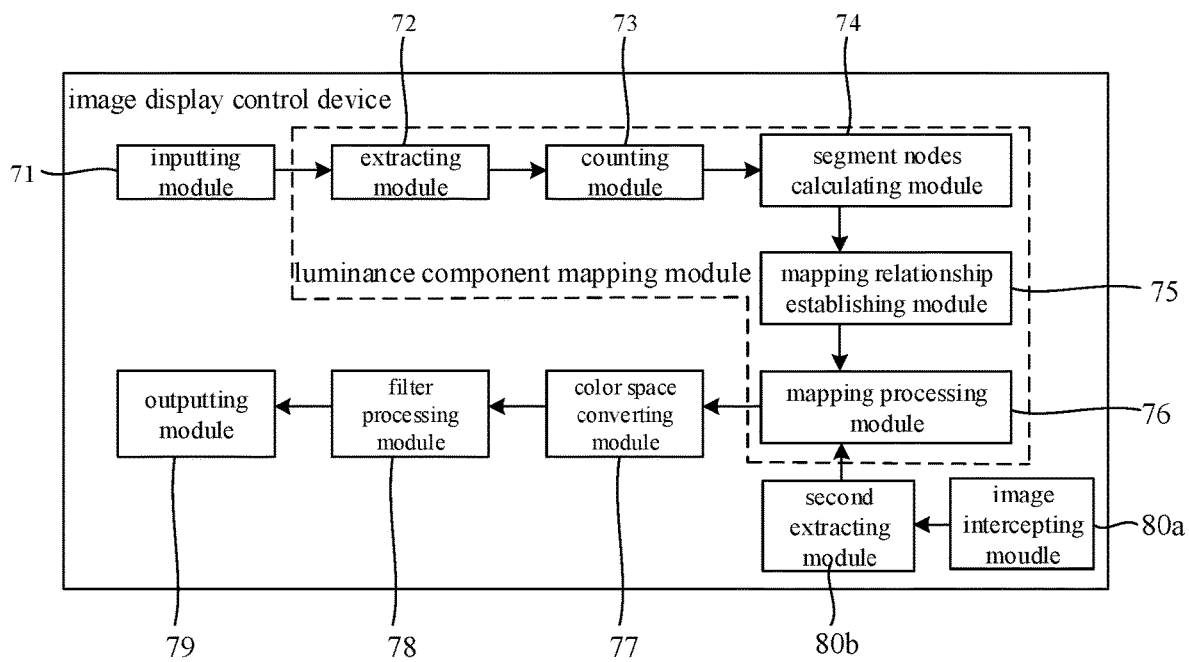
FIG. 7 is a schematic block diagram of an image display control device according to a fifth embodiment of the disclosure.

As shown in FIG. 7, a fifth embodiment of the disclosure provides an image display control device 70, which includes an inputting module 71, a luminance component mapping module, a color space converting module 77, a filter processing module 78, an outputting module 79, an image intercepting module 80*a*, and a second extracting module 80*b*. Exemplarily, the luminance component mapping module is configured to perform luminance-component mapping on pixel data of the input image, and includes an extracting module 72, a counting module 73, a segment nodes calculating module 74, a mapping relationship establishing module 75, and a mapping processing module 76. These modules 71-79, 80*a* and 80*b* may be software modules, stored in a memory and executed by one or more processors. For example, modules 71-73 may be stored in a memory of the sending card and executed by a programmable logic device thereof, and modules 74-79, 80*a* and 80*b* may be stored in a memory of the receiving card and executed by a programmable logic device thereof. In another embodiment, modules 71-75 can be stored in a memory of the sending card and executed by a programmable logic device thereof, modules 76-79, 80*a* and 80*b* may be stored in a memory of the receiving card and executed by a programmable logic device thereof.

More specifically, the inputting module 71 is configured to receive an input image. The extracting module 72 is configured to extract luminance component values corresponding to pixel data of the input image in a luminance-chrominance separation color space. The counting module 73 is configured to perform probability statistics on the luminance component values of the input image in N segments, where N segments have (N+1) initial segment nodes and N refers to a positive integer greater than 1. Segment nodes calculating module 74 is configured to obtain (N+1) target segment nodes based on the probability statistical values of the N segments and a brightness adjustment factor. The mapping relationship establishing module 75 is configured to establish segmented linear mapping relationships between initial luminance component values and target luminance component values, based on the (N+1) initial segment nodes and the (N+1) target segment nodes. The image intercepting module 80*a* is configured to capture/intercept image to obtain all of or a part of pixel data of the input image as target pixel data for the later mapping process. The second extracting module 80*b* is configured to extract pixel luminance component values of the target pixel data in the luminance-chrominance color space. The mapping processing module 76 is configured to take the pixel luminance component values corresponding to the target pixel data of the input image in the luminance-chrominance color space as initial luminance component values, and performing luminance-component mapping on the target pixel data of the input image according to the segmented linear mapping relationships. The color space converting module 77 is configured to convert the target pixel data after the luminance-component mapping from the luminance-chrominance color space to the primary color space. The filter processing module 78 is configured to perform filtering on the target pixel data that are converted into the primary color space after the luminance-component mapping. The outputting module 69 is configured to output the target pixel data after the filtering to the display screen for image display. Details of the specific functions of the modules 71-79, 80*a* and 80*b*, can be referred to the execution details of the steps S11-S15 and sub-steps S121-S125 in the foregoing first embodiment, and therefore no more details is provided herein.

In the embodiments of the disclosure, it should be understood that the disclosed systems, devices, and/or methods may be implemented in other ways. For example, the device described above is merely illustrative. For example, the division of the modules is only a logical function division. In actual implementation, there may be another division manner, for example, multiple units or components may be combined or integrated into another system, or some features can be ignored or not executed. In addition, the coupling, direct coupling or communication connection as shown or discussed may through some interface, device or unit, and further may be in electrical, mechanical or otherwise.

The units described as separate components maybe or maybe not physically separated, and the components illustrated as units maybe or maybe not physical units, that is, may be located in one place, or may be distributed to multiple network units. Some or all of the units may be selected according to actual needs to achieve the purposes of the solutions of the embodiments.

In addition, each functional unit in various embodiments of the disclosure may be integrated into one processing unit, or each unit may be physically separated, or two or more units may be integrated into one unit. The above integrated unit can be implemented in a form of hardware or in a form of hardware plus a software functional unit(s).

The above-described integrated unit implemented in the form of a software functional unit(s) can be stored in a computer readable storage medium. The above software functional unit is stored in a storage medium and includes instructions for causing one or more processors of a computer device (which may be a personal computer, a server, or a network device, etc.) to perform some steps of the methods described in various embodiments of the disclosure. The foregoing storage medium may be: a U disk, a mobile hard disk, a read-only memory (ROM), a random access memory (RAM), a magnetic disk, an optical disk, or the like medium that program codes can be stored thereon.

Finally, it should be noted that the above embodiments are only for exemplarily illustrating the technical solutions of the disclosure, but not intended for limiting the disclosure; although the disclosure has been described in detail with reference to the foregoing embodiments, for the person skilled in the art of the disclosure, it should be understood that the technical solutions described in the foregoing embodiments may be modified, or some of the technical features may be equivalently substituted; and these modifications or substitutions do not make the essences of corresponding technical solutions deviate from the spirit and scope of the technical solutions of the embodiments of the disclosure.

What is claimed is:

1. An image display control method, comprising:
receiving an input image;
performing luminance-component mapping on target pixel data of the input image;
converting the target pixel data after the luminance-component mapping from a luminance-chrominance separation color space to a primary color space;
performing filtering on the target pixel data which are converted to the primary color space after the luminance-component mapping; and
outputting the target pixel data after the filtering to a display screen for image display;
wherein performing luminance-component mapping on target pixel data of the input image comprises:
extracting pixel luminance component values corresponding to pixel data of the input image in the luminance-chrominance separation color space;
performing probability statistics on the pixel luminance component values of the input image in N segments, wherein the N segments have (N+1) initial segment nodes, and N refers to a positive integer greater than 1;
acquiring (N+1) target segment nodes based on probability statistical values in the N segments and a brightness adjustment factor;
establishing segmented linear mapping relationships between initial luminance component values and target luminance component values, by using the (N+1) initial segment nodes and the (N+1) target segment nodes; and
taking the pixel luminance component values corresponding to the target pixel data of the input image in the luminance-chrominance separation color space as the initial luminance component values, and performing the luminance-component mapping on the target pixel data according to the segmented linear mapping relationships.

2. The image display control method according to claim 1, before extracting pixel luminance component values corresponding to pixel data of the input image in the luminance-chrominance separation color space, the image display control method further comprising:
converting the input image from a primary color space to the luminance-chrominance separation color space.

3. The image display control method according to claim 1, further comprising:
performing image intercepting to obtain the target pixel data corresponding to a local area of the input image.

4. The image display control method according to claim 1, wherein the primary color space is a RGB color space, and the luminance-chrominance separation color space is a YUV color space or a YCbCr color space.

5. The image display control method according to claim 1, wherein performing filtering on the target pixel data which are converted to the primary color space after the luminance-component mapping comprises:
performing bandpass filtering on each color component in the primary color space of the target pixel data after the luminance-component mapping.

6. A display screen control system, comprising a sending card, a receiving card and a light emitting diode (LED) display screen, and the receiving card being connected between the sending card and the LED display screen; wherein the sending card is configured for:
receiving an input image;
performing luminance-component mapping on the input image;
converting the input image after the luminance-component mapping from a luminance-chrominance separation color space to a primary color space;
performing filtering on the input image which is converted to the primary color space after the luminance-component mapping; and
outputting the input image after the filtering to the receiving card to thereby drive the display screen for image display;
wherein performing luminance-component mapping on the input image by the sending card comprises:
extracting pixel luminance component values corresponding to pixel data of the input image in the luminance-chrominance separation color space;
performing probability statistics on the pixel luminance component values of the input image in N segments, wherein the N segments have (N+1) initial segment nodes and N refers to a positive integer greater than 1;
acquiring (N+1) target segment nodes based on probability statistical values in the N segments and a brightness adjustment factor;
establishing segmented linear mapping relationships between initial luminance component values and target luminance component values, by using the (N+1) initial segment nodes and the (N+1) target segment nodes; and
taking the pixel luminance component values of the input image as the initial luminance component values, and performing the luminance-component mapping on target pixel data of the input image according to the segmented linear mapping relationships.

7. A display screen control system, comprising a sending card, a receiving card and an LED display screen, and the receiving card being connected between the sending card and the LED display screen;

wherein the sending card is configured for:
receiving an input image; and
performing segmented probability statistics on pixel luminance component values of the input image; and wherein the receiving card is configured for:
receiving probability statistical values;
performing luminance-component mapping on pixel data of a local area of the input image, based on the probability statistical values;
converting the pixel data of the local area after the luminance-component mapping from a luminance-chrominance separation color space to a primary color space;
performing filtering on the pixel data of the local area which are converted to the primary color space after the luminance-component mapping; and
outputting the pixel data of the local area after the filtering to the display screen for image display;

wherein performing segmented probability statistics on pixel luminance component values of the input image through the sending card comprises:
extracting the pixel luminance component values corresponding to pixel data of the input image in the luminance-chrominance separation color space; and
performing the probability statistics on the pixel luminance component values of the input image in N segments, wherein the N segments have (N+1) initial segment nodes and N refers to a positive integer greater than 1.

8. The display screen control system according to claim 7, wherein performing luminance-component mapping on pixel data of a local area of the input image based on the probability statistical values through the receiving card comprises:
acquiring (N+1) target segment nodes based on the probability statistical values in the N segments and a brightness adjustment factor;
establishing segmented linear mapping relationships between initial luminance component values and target luminance component values, by using the (N+1) initial segment nodes and the (N+1) target segment nodes;
intercepting the pixel data of the local area of the input image; and
taking the pixel luminance component values corresponding to the pixel data of the local area in the luminance-chrominance separation color space as the initial luminance component values, and performing the luminance-component mapping on the pixel data of the local area according to the segmented linear mapping relationships.

* * * * *